April 24, 1956 — H. SCHEIBLER — 2,742,902
DISPENSING CONTAINER
Filed Dec. 9, 1952

INVENTOR.
HERMAN SCHEIBLER
BY
Greene, Pineles & Durr
ATTORNEYS

United States Patent Office 2,742,902
Patented Apr. 24, 1956

2,742,902

DISPENSING CONTAINER

Herman Scheibler, Katonah, N. Y.

Application December 9, 1952, Serial No. 324,946

3 Claims. (Cl. 128—237)

This invention relates to a dispensing device or dispensing units arranged for storing a quantity of a dispersable fluid medicinal substance which is to be applied to an interior part of the body, permitting direct discharge or dispersion of its contents at the point of application without danger of contamination by foreign substances.

This application is a continuation-in-part of application Serial No. 221,796, filed April 19, 1951, now abandoned.

The object of the invention is to provide a simple self-contained unitary tubular medical dispensing device, the contents of which may be stored therein and at the desired time directly discharged in a sanitary manner, and without danger of contamination, into a body cavity.

The foregoing object of the invention will be best understood from the following detailed description of exemplifications thereof, reference being had to the accompanying drawing, wherein.

In accordance with the invention a dispersable medicinal substance in the form of a medicinal fluid, paste or fluffy preparation that is to be applied to internal parts of the body, is enclosed in a tubular container of substantially the same cross-section throughout its length which may be readily made of known plastic materials and provided with seating closure ends of its two wide opposite ends so arranged as to permit the direct discharge of the said contents at the desired point of application within the body cavity. The dispensing device includes a removable closure member with a long rod-like extension which forms one seating closure section and is also adapted to cooperate with a movable plug forming the other seating closure to force the contents out of the tube as required. The dispensing container of the invention is so arranged as to maintain its medicinal contents in aseptic, clean condition for a prolonged period of time and permit discharge of the so maintained contents into delicate interior parts of the body.

There are many cases in which the medicinal substance that is stored in a container is of the type which contains ingredients that may evaporate when kept for an extended period of time such as several months or even a year or more. It is accordingly desirable that the contents of the container be sealed against evaporation and drying when stored for long periods of time. Various available resinous or plastic materials may be used for providing vaporproof tubular enclosures suitable for use in devices of the invention, including thermoplastic resinous materials, such as polyethylene and the cellulose esters, thermosetting resinous materials such as phenol-aldehyde, urea-aldehyde resins, etc. However, the tubular container of devices of the invention may be also made of a paper material, in which case the tubular paper container which is made of suitable thickness and which serves to prevent its collapse, is impregnated with a vapor-tight wax substance or a vapor-tight thermoplastic resinous material.

The filled container, with the sealing closure piston rod confined in the interior of the filled container, may then be placed either by itself or together with a small amount of similar filled containers within a suitable larger container within which it is packaged for sale to the public and which keeps the dispensing container in sanitary condition. Alternatively, the dispensing container may be placed in a wrapper of thin plastic vaporproof material such as vaporproof cellophane material or vaporproof rubber-hydrochloride film material which is thermally sealed to provide the sanitary wrapping enclosure for each dispensing device, which enclosure may be readily removed before the dispensing device is used.

One form of a dispensing device of the invention will now be described.

Figure 1:
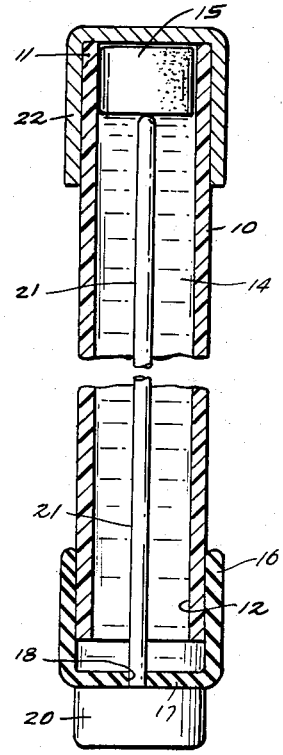
Fig. 1 is a cross-sectional view of one form of a dispensing device of the invention in closed position in which it is supplied to the public.
Figure 2:
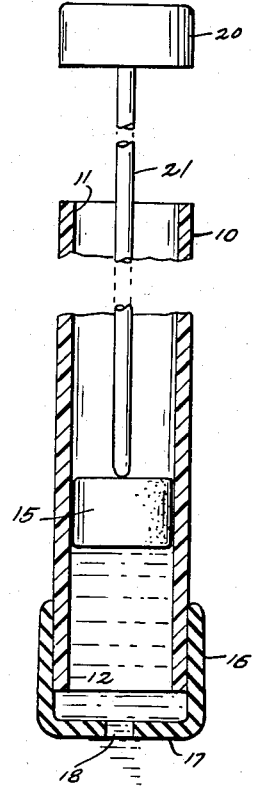
Fig. 2 is a cross-sectional view showing how the contents of the device of Fig. 1 are dispensed.

Figs. 1 and 2 show one form of dispensing device of the invention. It comprises a generally cylindrical tube 10 of uniform cross-section which has two similar wide ends 11, 12 of the same cross-section and which is filled with a medicinal substance 14, in liquid or semi-liquid creamy form, which is to be preserved therein against contamination for an extended period of time and which medicinal substance is to be discharged into a cavity of the human body.

The wide end 11 of the tube 10 is sealed against contamination by a tightly fitting sealing closure member 15 in the form of a piston-like sealing plug which is arranged so that it may be pushed by a push rod toward the opposite wide tube end 12 for discharging therefrom the medicinal substance 14 and injecting it into the body cavity. The sealing piston plug 15 may be formed, for instance, of wax impregnated felt or like material or suitable inert plastic material of limited elasticity arranged to fit tightly against the interior wall surfaces of the ejector end 11 of the container tube 10, and to provide a vapor-tight seal enclosure therefor which prevents the escape and evaporation of the medicinal substance 14 while it remains stored in the tube container 10 for a prolonged period of time. The sealing piston closure plug 15 is also so arranged as to slide in fitting engagement along the interior surface of the container tube and operate as a piston which discharges the medicinal substance 14 through the discharge end 12 of the container tube 10 when the piston plug 15 is pushed inwardly from the ejecting end 11 toward the discharge end 12 thereof.

The wide ejecting end 11 of the dispensing tube container 10 with the piston plug 15 seated therein is shown additionally sealed by a coating or closure layer 22 of vapor-tight material such as thermoplastic film material, such as vinyl chloride film material, rubber hydrochloride film material or aluminum foil with or without such thermoplastic film sealing material.

Such thermoplastic coating film seal 22 may be applied to the ejecting tube end 11 with the piston plug 15 seated therein by dipping in the molten body of the thermoplastic film sealing substance out of which the film coating 22 is formed or by thermoplastically sealing to the exterior of the tube end 11 a closure member 22 of such thermoplastic film material. Similar protective coating may be also applied over the sealing closure of the other discharge end 12 of the container tube 10 or to the entire container tube 10 with its two closure ends in position as described hereinafter.

The other wide discharge end 12 of the container tube 10 is closed in a vapor-tight manner by sealing closure means shown formed of a wide closure member 16 of yieldable elastic rubber-like material engaging the substantial length of walls of the container tube 10 in the region of its discharge end 12 which surrounds the discharge opening. The wide closure member 16 has a small discharge opening 18 which is shown tightly closed by a supplemental closure member 20 overlying the discharge opening 18 and having an elongated push rod 21 extending therefrom and passing with a tight sealing fit through the small discharge opening 18 of yieldable wide closure member 16 and beyond it through substantially the entire length of the interior of the container tube 10.

Referring to Figs. 1 and 2, the wide yieldable elastic closure member 16 has in addition to the generally cylindrical walls which are seated with a tight compressive elastic fit around and in engagement with the substantial length of the cylindrical walls of the container tube 10 at its discharge end 12, a yieldable transverse end wall 17 with its central smaller discharge opening 18. This end wall 17 is spaced by a short distance from the discharge end portion 12 of the container tube 10. The diameter of the cylindrical portion of the closure member 16 is somewhat smaller than the outer diameter of the container tube portion 12 so that the elastic compressive forces of its rubber-like material keep it sealed thereon when the contents 14 are forced through the small discharge opening 18 thereof. This arrangement permits placing a row of similar tubular containers in side by side relation within a holder jig for moving a series of similar adjacent container tubes 10 towards a filling nozzle of a filling machine which fills the container by way of opening 18 of the closure member 16 with the desired medicinal substance, as successive container tubes 10 are brought with their discharge openings 18 of their closure members 16 opposite the filling nozzle of the filling machine.

After filling the series of container tubes 10 in a sanitary manner with the medicinal fluid substance, the push rods 21 of the complementary closure members 20 are inserted by way of the smaller closure openings 18 into the interior of each of the so-filled dispensing container tubes 10 until the wider closure portion 12—which serves also as a closure grip of the closure push rod 21—reaches a position of sealing engagement with the yieldable end wall 17 of the closure member 16.

Dispensing container devices of the invention of the type described above in connection with Figs. 1 and 2 may be stored with their medicinal contents for a prolonged period of time without loss by evaporation of any ingredients of its contents. In order to apply or discharge the medicinal substance of such dispensing container tube 10 into a body cavity, the outer sealing closure 22 of its ejecting end is removed, and the closure grip 20 of the push rod is seized and its push rod 21 is withdrawn through the closure opening 18 from the interior of the container tube 10. Thereupon, the container tube 10 is inserted—with the closure member 16 of its discharge end 12 firmly affixed thereto—into the desired proper position within the body cavity, whereupon the end of the push rod 21 is applied against the outer end of the piston plug 15 of the container tube 10, thereby pressing the piston plug 15 inwardly into the container tube 10 and forcing the medicinal substance 14 through the small discharge end 18 directly at the desired selected point of application within the body cavity.

Without thereby limiting the scope of the invention, there are given below, by way of example, design data of one practical device of the invention. The container tube 10 is of cylindrical shape with generally smooth interior and exterior surfaces throughout its length and is formed of polyethylene tubing having walls about 1/32 inch thick and an overall length of 5 inches. The container tube 10 has a generally smooth interior. The plug member 15 is about 1/2 inch long. The yieldable closure member 16 seated over the discharge end 12 of the container is formed of neoprene rubber 3/32 inch thick. The small discharge opening 18 is of cylindrical shape and has a diameter of 3/32 inch. The push rod 21 is made of a stiff synthetic resin material being of circular cross-section and with a diameter of about 1/8 of an inch.

Figure 3:
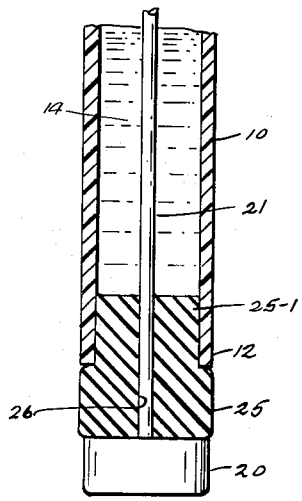
Fig. 3 is a partial cross-sectional view showing a modified device of the invention.

Fig. 3 shows a modified form of a medicinal substance dispensing container of the type described above in connection with Figs. 1 and 2. The device of Fig. 3 is similar to that of Figs. 1 and 2 except that the discharge end 12 of the container tube 10 is closed by a modified form of closure member 25 of yieldable elastic rubber-like material having a small discharge opening 26 arranged to receive the push rod 21 of the closure grip 20 overlying and providing a seal for the small discharge opening 26 of yieldable closure member 25. The yieldable closure member 25 has an inner portion 25—1 which is engagement with a substantial length of the cylindrical walls of the container tube discharge end 12, a portion of the yieldable closure member 25 projecting beyond the outer end of the container end portion 12. The device of Fig. 3 is otherwise similar to that of Figs. 1 and 2. The inner portion 25—1 of the rubber-like closure member 25 is of somewhat greater diameter than the surrounding walls of the container tube end 12 so that it remains affixed to the tube end 12 when the medicinal substance 14 is forcefully discharged by way of the small opening 26 of closure member 25.

As in the device of Figs. 1 and 2, the inner rubber-like closure portion 25—1 of closure member 25 is elastically compressed and it clampingly engages with its interior surfaces a substantial length of the exterior surfaces of container tube 10 near its tube discharge opening 12. The portion of the elastic closure member 25 projecting beyond the tube end edges of container tube 10 at its discharge end 12 forms a rubber-like wall overlapping the tube end edges at the tube opening 12 and it extends a small distance beyond said tube edges.

Figure 4:
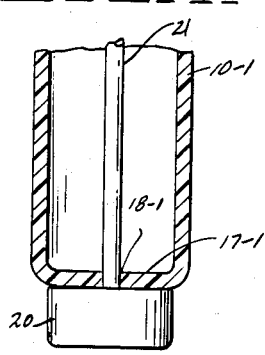
Figs. 4, 5 and 6 are partial detailed views similar to Fig. 1 showing another modified form of the device of the invention.

Fig. 4 shows a further modification of the device of the invention. It differs from that of Fig. 1 in that the similar container tube 10—1 is provided at its discharge end with an end wall 17—1 of the same plastic material as the container walls and having formed therein a small discharge opening 18—1 which is sealingly enclosed by the push rod 21 with the overlying enlarged push rod grip enclosure member 20.

Figure 5:
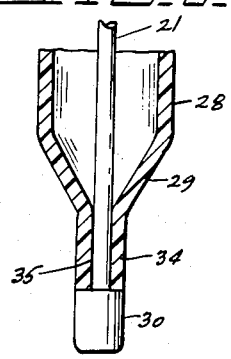
Figure 6:
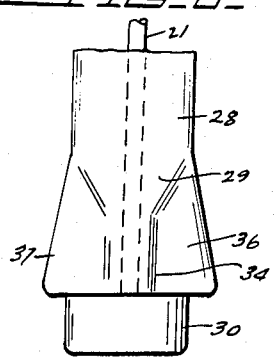

Figs. 5 and 6 show a further modification of a device of the invention. It differs from the device of Fig. 4 in that the container tube 28 of plastic material, similar to the container tube 10 of Figs. 1 and 2, is flattened at its discharge end 29 and united at the sides 36, 37 (Fig. 6) to form the tubular channel 34, with its central discharge opening 35 of the desired small discharge cross-section. The discharge opening 35 of this container tube 28 is held sealed by the push rod 21 fitting and passing through the discharge opening 35 and provided with a grip end closure portion 30 overlying the discharge end wall of the container tube 28 with its discharge opening 35.

Container tubes of the dispensing devices of the invention may be readily made of available inert chemically thermoplastic resinous materials, such as polyethylene and cellulose esters, thermosetting resinous materials, such as phenol-aldehyde resins, urea-aldehyde resins and the like. The push rod 21 may likewise be made of a synthetic resin material which is chemically inert to the medicinal compositions that are to be dispensed. The piston plug 15 may be formed from cotton or wool felt or elastic inert plastic material.

It will be apparent to those skilled in the art that the novel principles of the invention disclosed herein in connection with specific exemplifications thereof will suggest various other modifications and applications of the same. It is accordingly desired that in construing the breadth of the appended claims they shall not be limited to the specific exemplifications of the invention described above.

I claim:

1. In a packaged elongated medicinal dispensing device for storing a measured amount of a fluid medication composition in a sanitary condition and directly discharging said composition at its point of application: an elongated container tube having two tube openings at its two opposite ends which are of substantially the same cross-section as the intermediate portion of said tube, a fluid medicinal composition filling substantially the entire free interior space within said container, a piston-like plug member constituting a vapor sealing body tightly fitting and slidably positioned within the interior of said tube at one tube opening to provide a vapor seal for the composition enclosed in said tube, a vapor proof closure structure for the other tube opening comprising a relatively wide closure member of yieldable elastic rubber-like material overlapping the tube end edges and engaging a substantial length of the walls of said tube at said other tube opening and also having a discharge opening of smaller size than the said other tube opening for discharging the composition contents of said tube when said plug member is pushed inwardly from said one tube opening toward said other tube opening, said closure structure also including a complementary closure member comprising a relatively stiff rod fitting and seated within said discharge opening and extending substantialy through the entire length of the fluid composition filling said tube, said rod having a wider outer grip portion forming an outer fixed part of said rod, the width of said rod being at most equal to the maximum width of any cross-sectional area of said tube, said grip portion overlying and engaging the outer side of said closure member and constituting with said rod and said closure member a vapor seal for the fluid composition enclosed in said tube, said rod being withdrawably held in said discharge opening to permit withdrawal of said rod from said tube through said discharge opening by gripping its grip portion of the inner end of said rod against the exterior side of said piston-like plug member for pushing it inwardly and discharging said composition from the interior of said tube through said discharge opening.

2. In a packaged medicinal device as claimed in claim 1, said wide closure member having a tubular wall portion surrounding and elastically clamped around the exterior wall surfaces of said tube at said other tube opening, and an adjoining transverse wall portion overlapping and extending beyond said tube end edges, said transverse wall portion having said discharge opening.

3. In a packaged medicinal device as claimed in claim 1, said wide closure member having an inward compressed closure portion elastically clamped with its exterior surface against interior wall surfaces at said other tube end and an adjoining outward wall portion overlapping and extending beyond said tube end edges, said inward closure portion and its adjoining outward wall portion having said discharge opening.

References Cited in the file of this patent

UNITED STATES PATENTS

| | | |
|---|---|---|
| 1,898,803 | Young | Feb. 21, 1933 |
| 2,090,111 | Creveling | Aug. 17, 1937 |
| 2,195,675 | Lewis | Apr. 2, 1940 |